United States Patent
Tokito et al.

(10) Patent No.: US 9,696,694 B2
(45) Date of Patent: Jul. 4, 2017

(54) PARAMETER SETTING DEVICE

(71) Applicants: Hiroshi Tokito, Tokyo (JP); Kazuhiro Abe, Tokyo (JP); Tsutomu Yoshikawa, Tokyo (JP)

(72) Inventors: Hiroshi Tokito, Tokyo (JP); Kazuhiro Abe, Tokyo (JP); Tsutomu Yoshikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 415 days.

(21) Appl. No.: 14/384,553

(22) PCT Filed: Dec. 17, 2012

(86) PCT No.: PCT/JP2012/082637
§ 371 (c)(1),
(2) Date: Sep. 11, 2014

(87) PCT Pub. No.: WO2013/150686
PCT Pub. Date: Oct. 10, 2013

(65) Prior Publication Data
US 2015/0081048 A1 Mar. 19, 2015

(30) Foreign Application Priority Data
Apr. 2, 2012 (JP) .................. 2012-083512

(51) Int. Cl.
*G05B 11/01* (2006.01)
*G05B 19/042* (2006.01)

(52) U.S. Cl.
CPC .......... *G05B 11/01* (2013.01); *G05B 19/0426* (2013.01); *G05B 2219/31103* (2013.01)

(58) Field of Classification Search
CPC ................ G05B 11/01; G05B 19/0426; G05B 2219/31103
See application file for complete search history.

(56) References Cited

U.S. PATENT DOCUMENTS

| 6,178,228 B1 | 1/2001 | Schol |
| 7,209,793 B2 * | 4/2007 | Harmse ................. G05B 17/02 700/28 |

(Continued)

FOREIGN PATENT DOCUMENTS

| CN | 102236352 A | 11/2011 |
| JP | 62-219007 | 9/1987 |

(Continued)

OTHER PUBLICATIONS

Combined Chinese Office Action and Search Report issued Dec. 16, 2015 in Patent Application No. 201280072133.9 (with Partial English Translation of the Search Report).

(Continued)

*Primary Examiner* — Charles Kasenge
(74) *Attorney, Agent, or Firm* — Oblon, McClelland, Maier & Neustadt, L.L.P.

(57) ABSTRACT

A technique that allows determination of appropriate control parameter values automatically. A constraint evaluation indicator setting unit sets, to each of a plurality of additional constraints, a third evaluation indicator obtained by combining a first evaluation indicator that indicates a level of influence on other control parameters when a control parameter is changed, and a second evaluation indicator that indicates weight according to a property including importance and the like. A constraint satisfaction solution retrieve unit retrieves a combination of control parameter values that satisfies constraints. When the constraint satisfaction solution retrieve unit fails to retrieve the combination of control parameter values, a constraint relaxing unit relaxes the additional constraints in accordance with the third evaluation indicator.

6 Claims, 10 Drawing Sheets

(56) References Cited

U.S. PATENT DOCUMENTS

| | | | |
|---|---|---|---|
| 7,337,022 B2* | 2/2008 | Wojsznis | G05B 11/32 700/28 |
| 7,376,472 B2* | 5/2008 | Wojsznis | G05B 11/32 700/28 |
| 8,200,369 B2* | 6/2012 | Cheng | F23N 5/242 700/108 |
| 8,396,582 B2* | 3/2013 | Kaushal | G05B 13/0265 700/100 |
| 8,744,607 B2* | 6/2014 | Kaushal | G05B 13/0265 700/100 |
| 2004/0049295 A1* | 3/2004 | Wojsznis | G05B 11/32 700/28 |
| 2004/0049299 A1* | 3/2004 | Wojsznis | G05B 11/32 700/29 |
| 2005/0055110 A1 | 3/2005 | Tuszynski | |
| 2005/0288812 A1 | 12/2005 | Cheng et al. | |
| 2008/0147365 A1 | 6/2008 | Prasad et al. | |
| 2010/0138026 A1* | 6/2010 | Kaushal | G05B 13/0265 700/104 |
| 2011/0249146 A1 | 10/2011 | Ishida | |
| 2011/0270421 A1 | 11/2011 | Kawamoto et al. | |

FOREIGN PATENT DOCUMENTS

| | | |
|---|---|---|
| JP | 04-081968 | 3/1992 |
| JP | 11-338534 | 12/1999 |
| JP | 2001-125624 | 5/2001 |
| JP | 2012-079246 | 4/2012 |
| JP | 2012-221450 | 11/2012 |
| TW | 200506559 A | 2/2005 |
| TW | 200540674 A | 12/2005 |
| TW | 200715083 A | 4/2007 |
| TW | 200721248 A | 6/2007 |
| TW | 200844699 A | 11/2008 |

OTHER PUBLICATIONS

International Preliminary Report on Patentability and Written Opinion issued Oct. 16, 2014 in PCT/JP2012/082637 (English transition).

Combined Taiwanese Office Action and Search Report issued Sep. 19, 2014 in Patent Application No. 102109434 (with partial English language translation).

International Search Report issued Feb. 26, 2013 in PCT/JP12/082637 filed Dec. 17, 2012.

Mizuno, K.et al., "Solving Constraint Satisfaction Problems by an Adaptive Stochastic Search Method", Transactions 5 of Information Processing Society of Japan, vol. 39, No. 8, pp. 2143-2420, 1998 ( with English abstract).

* cited by examiner

CONSTRAINT DATABASE

21 — PREMISE CONSTRAINT
- "NETWORK TYPE" = {Ethernet, CC-IE, MNET}
- 0 ≤ "START I/O No." ≤ 4096
- "START I/O No." %16 = 0
- 1 ≤ "NETWORK No." ≤ 256
- 1 ≤ "TOTAL NUMBER OF (SLAVE) STATIONS" ≤ 64
- if ("NETWORK TYPE" = MNET) then "STATION NUMBER" = 0
- "STATION NUMBER" ≤ "TOTAL NUMBER OF (SLAVE) STATIONS"
- 0 ≤ "GROUP No." ≤ 32

22 — ADDITIONAL CONSTRAINT
·
·
·
·
·
·

23 — PARAMETER WEIGHT LIST

| PARAMETER TYPE | WEIGHT VALUE (SECOND EVALUATION INDICATOR VALUE) |
|---|---|
| NETWORK TYPE | 3 |
| START I/O No. | 3 |
| NETWORK No. | 1 |
| TOTAL NUMBER OF (SLAVE) STATIONS | 3 |
| STATION NUMBER | 2 |
| GROUP No. | 1 |

F I G. 4

| PARAMETER TYPE | SETTING VALUE |
|---|---|
| NETWORK TYPE | ▼ |
| START I/O No. | |
| NETWORK No. | |
| TOTAL NUMBER OF (SLAVE) STATIONS | |
| STATION NUMBER | |
| GROUP No. | |

INPUT UNIT 12

F I G. 5

INPUT UNIT 12

| PARAMETER TYPE | SETTING VALUE |
|---|---|
| NETWORK TYPE | CC-IE |
| START I/O No. | 0 |
| NETWORK No. | 1 |
| TOTAL NUMBER OF (SLAVE) STATIONS | 5 |
| STATION NUMBER | 7 |
| GROUP No. | 1 |

CONSTRAINT EVALUATION INDICATOR DATABASE

| ADDITIONAL CONSTRAINT | FIRST EVALUATION INDICATOR VALUE |
|---|---|
| "NETWORK TYPE" = "CC-IE" | 1.75 |
| "START I/O No." = 0 | 1 |
| "NETWORK No." = 1 | 1 |
| "TOTAL NUMBER OF (SLAVE) STATIONS" = 5 | 1.75 |
| "GROUP No." = 1 | 1 |
| "STATION NUMBER" = 7 | 2 |

FIG. 8

CONSTRAINT EVALUATION INDICATOR DATABASE

| ADDITIONAL CONSTRAINT | THIRD EVALUATION INDICATOR VALUE |
|---|---|
| "NETWORK TYPE" = "CC-IE" | 5.25 |
| "START I/O No." = 0 | 3 |
| "NETWORK No." = 1 | 1 |
| "TOTAL NUMBER OF (SLAVE) STATIONS" = 5 | 5.25 |
| "GROUP No." = 1 | 1 |
| "STATION NUMBER" = 7 | 4 |

F I G. 9

| TOTAL NUMBER OF STATIONS | | | |
|---|---|---|---|
| STATION NUMBER | NUMBER OF POINTS | START | LAST |
| FIRST STATION | | | |
| SECOND STATION | | | |
| THIRD STATION | | | |
| FOURTH STATION | | | |

F I G. 1 0

| TOTAL NUMBER OF STATIONS | | 2 | |
|---|---|---|---|
| STATION NUMBER | NUMBER OF POINTS | START | LAST |
| FIRST STATION | 32 | 0 | 31 |
| SECOND STATION | 16 | 32 | 47 |
| THIRD STATION | | | |
| FOURTH STATION | | | |

CONSTRAINT EVALUATION INDICATOR DATABASE 15

| ADDITIONAL CONSTRAINT | FIRST EVALUATION INDICATOR VALUE |
|---|---|
| "TOTAL NUMBER OF STATIONS" = 2 | 2 |
| "NUMBER OF POINTS IN FIRST STATION" = 32 | 2.5 |
| "LAST IN SECOND STATION" = 16 | 3 |

F I G. 1 3

CONSTRAINT EVALUATION INDICATOR DATABASE 15

| ADDITIONAL CONSTRAINT | FIFTH EVALUATION INDICATOR VALUE |
|---|---|
| "TOTAL NUMBER OF STATIONS" = 2 | 6 |
| "NUMBER OF POINTS IN FIRST STATION" = 32 | 5 |
| "LAST IN SECOND STATION" = 16 | 3 |

FIG. 14

| PARAMETER TYPE | SETTING VALUE |
|---|---|
| NETWORK TYPE | ▼ |
| START I/O No. | |
| NETWORK No. | |
| TOTAL NUMBER OF (SLAVE) STATIONS | |
| STATION NUMBER | |
| GROUP No. | |

INPUT UNIT

AUTOMATIC MODIFICATION MODE
☐ PARAMETER PROPERTY PRIORITY  ☐ INPUT ORDER PRIORITY

PARAMETER SETTING DEVICE

TECHNICAL FIELD

The present invention relates to a parameter setting device for setting control parameters for a control apparatus that controls predetermined devices, such as a factory automation (FA) device.

BACKGROUND ART

An FA control apparatus that controls an FA device is provided with a unit for each function, such as, for example, a controller unit for performing calculation in accordance with a control program, an input unit that is connected to an input apparatus such as a sensor and a switch with an on/off signal thereof being inputted as an input signal, an output unit that is connected to an output apparatus such as an actuator and a relay and outputs an output signal thereto, a communication unit that is connected to a higher-level terminal device, etc. and exchanges information, and a power supply unit for supplying electric power to each unit. Then, in the FA control apparatus, a function necessary for controlling individual FA device is achieved by combining the plurality of units.

An attribute of each unit is set by a user inputting the control parameters into a controller by using an engineering tool. Some of these control parameters have restrictive relationship with each other. For example, there is a constraint, such as "at a time of setting of a control parameter A, setting of a control parameter B is essential", and "it is necessary to make a setting value of a control parameter C equal to or smaller than a setting value of a control parameter D". When the user sets control parameters, it is necessary to set the control parameters with attention to satisfying such restrictive relationship.

Herein, Patent Document 1 discloses, when a user changes a certain control parameter, and in a case where another control parameter that has a connection with the control parameter does not satisfy a constraint, a technique of displaying those control parameters.

PRIOR ART DOCUMENT

Patent Document

Patent Document 1: Japanese Patent Application Laid-Open No. 2001-125624

SUMMARY OF INVENTION

Problems to be Solved by the Invention

In an FA control apparatus, since there are abundant functions that can be achieved by combining each unit, control parameters to be set have a wide variety, and furthermore, a constraint (restrictive relationship) that extends over units also exists. Accordingly, when a user with little experience of using the FA control apparatus performs an inadequate input while setting the control parameters, a combination of control parameter values that satisfies the constraint (restrictive relationship) may be lost.

In such a case, even if the user with little experience of use finds a parameter that causes inconsistency of the constraint by using the technique or the like described in Patent Document 1, there is a problem that it is difficult to determine at what value this parameter is to be set.

Therefore, the present invention has been made in view of the above problems, and an object of the present invention is to provide a technique that allows automatic determination of appropriate control parameter values.

Means for Solving the Problems

A parameter setting device according to the present invention is a parameter setting device for setting a plurality of control parameters for a control apparatus that controls a predetermined device, the parameter setting device including a constraint database configured to store a plurality of existing constraints to be satisfied by the plurality of control parameters, and a constraint generator configured, based on an inputted control parameter value, to generate a plurality of new constraint to be satisfied by the control parameter. The parameter setting device includes a constraint evaluation indicator setting unit configured to set a third evaluation indicator obtained by combining a first evaluation indicator and a second evaluation indicator to each of the plurality of new constraints, the first evaluation indicator indicating a level of influence on other control parameters when the control parameter related to the new constraint is changed, the second evaluation indicator indicating weight according to a property including at least one of importance degree of operation of the control apparatus defined by the control parameter related to the new constraint, and a frequency degree of use and frequency degree of input of the control parameter; a constraint satisfaction solution retrieve unit configured to retrieve a combination of the control parameter values that satisfies the plurality of new and existing constraints; and a constraint relaxing unit configured to relax the plurality of new constraints in accordance with the third evaluation indicator when the constraint satisfaction solution retrieve unit fails to retrieve the combination of the control parameter values. When the constraint relaxing unit relaxes the plurality of new constraints, the constraint satisfaction solution retrieve unit retrieves the combination of the control parameter values that satisfies the plurality of new constraints and the plurality of existing constraints.

Effects of the Invention

The parameter setting device according to the present invention, when a combination of control parameter values that satisfies the new and existing constraints does not exist, relaxes the new constraints in accordance with the third evaluation indicator obtained by combining the first evaluation indicator indicating a level of influence on other control parameters, and the second evaluation indicator indicating weight according to the property of the control parameters. That is, in a case where the new and existing constraints are not satisfied when a control parameter value is inputted, a new constraint is relaxed so that setting of the value of a control parameter with big influence on other control parameters, a control parameter whose value is usually not changed, or an important control parameter whose value should not be changed, is not changed as much as possible, thereby allowing automatic determination of an appropriate combination of control parameter values.

DESCRIPTION OF EMBODIMENTS

<First Embodiment>

Figure 1:
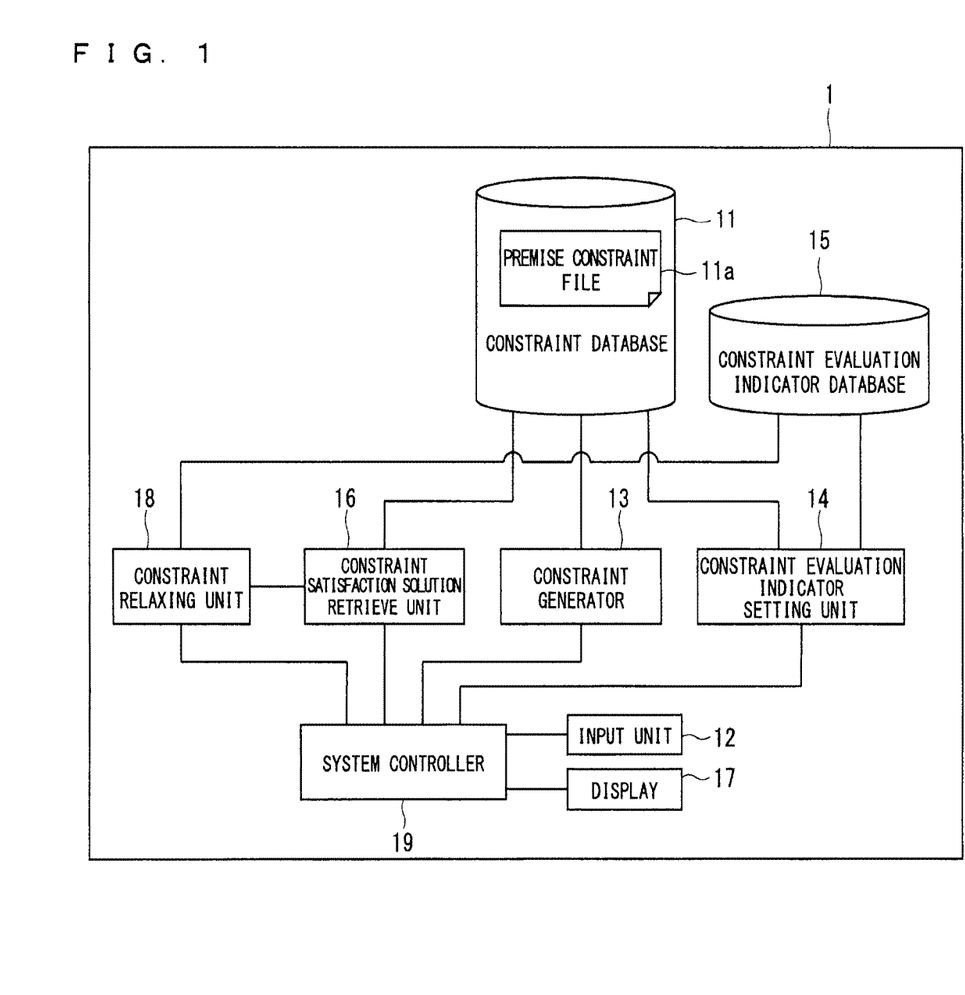
FIG. 1 is a block diagram illustrating a configuration of a parameter setting device according to a first embodiment.

FIG. 1 is a block diagram illustrating a configuration of a parameter setting device according to a first embodiment of the present invention. In the present embodiment, a parameter setting device 1 will be described as a device for setting a plurality of control parameters for an FA control apparatus (control apparatus) that controls an FA device (predetermined device).

As illustrated in FIG. 1, the parameter setting device 1 includes a constraint database 11 for storing a premise constraint file 11a, an input unit 12, a constraint generator 13, a constraint evaluation indicator setting unit 14, a constraint evaluation indicator database 15, a constraint satisfaction solution retrieve unit 16, a display 17, a constraint relaxing unit 18, and a system controller 19. The system controller 19 controls each component of the parameter setting device 1 as a whole, and executes processing such as, for example, data input processing from the input unit 12, display data output processing to the display 17, and data write/read processing to the constraint database 11 and the constraint evaluation indicator database 15.

A plurality of existing constraints (hereinafter, "a plurality of premise constraints") that a plurality of control parameters should satisfy are described in the premise constraint file 11a, the constraints being a premise for constructing a system. The constraint database 11 stores this premise constraint file 11a. Therefore, the constraint database 11 stores the plurality of premise constraints.

The input unit 12 receives input of a control parameter value for the FA control apparatus from a user who uses the FA device. The control parameter value received by the input unit 12 is inputted into the constraint generator 13 via the system controller 19.

Based on the inputted control parameter value, the constraint generator 13 generates a new constraint (hereinafter, "additional constraint") to be satisfied by the control parameter. The additional constraint generated by the constraint generator 13 is stored in the constraint database 11.

The constraint evaluation indicator setting unit 14 sets an evaluation indicator that indicates priority degree (importance degree) to each of the plurality of additional constraints (the plurality of additional constraints generated by the constraint generator 13) stored in the constraint database 11. In the present embodiment, the constraint evaluation indicator setting unit 14 sets a third evaluation indicator obtained by combining a first evaluation indicator and a second evaluation indicator, the first evaluation indicator indicating a level of influence on other control parameters when a control parameter related to the additional constraint is changed, the second evaluation indicator indicating weight according to a property including at least one of importance degree of operation of the FA control apparatus defined by the control parameter related to the additional constraint, and a frequency degree of use and frequency degree of input of the control parameter. The constraint evaluation indicator database 15 stores the additional constraints to which the constraint evaluation indicator setting unit 14 sets the third evaluation indicator.

The constraint satisfaction solution retrieve unit 16 obtains a plurality of premise constraints and additional constraints regarding the inputted control parameter from the constraint database 11. Then, the constraint satisfaction solution retrieve unit 16 retrieves a combination of control parameter values that satisfies the plurality of obtained premise constraints and additional constraints. Herein, for example, Kazunori Mizuno, Hitoshi Kanoh, Seiichi Nishihara, "Solving Constraint Satisfaction Problems by an Adaptive Stochastic Search Method", Transactions 5 of Information Processing Society of Japan, Vol. 39, No. 8, pp. 2413-2420 (1998) discloses a technique of determining a combination of parameter values that satisfies all constraint equations by stochastically changing individual parameter value in a direction in which a number of unsatisfied constraint equations decreases from a combination of arbitrary parameter values. It is possible to apply this technique to the constraint satisfaction solution retrieve unit 16.

When a combination of control parameter values are retrieved, the constraint satisfaction solution retrieve unit 16 outputs the combination of control parameter values to the display 17 via the system controller 19. The display 17 displays the combination of control parameter values retrieved by the constraint satisfaction solution retrieve unit 16.

When the constraint satisfaction solution retrieve unit 16 fails to retrieve the combination of control parameter values, that is, when the premise constraints and the additional constraints become inconsistent, the constraint relaxing unit 18 relaxes the plurality of additional constraints in accordance with the third evaluation indicator. In the present embodiment, the constraint relaxing unit 18 is configured to relax the plurality of additional constraints as a whole by disabling one additional constraint whose the third evaluation indicator is lowest.

Figure 2:
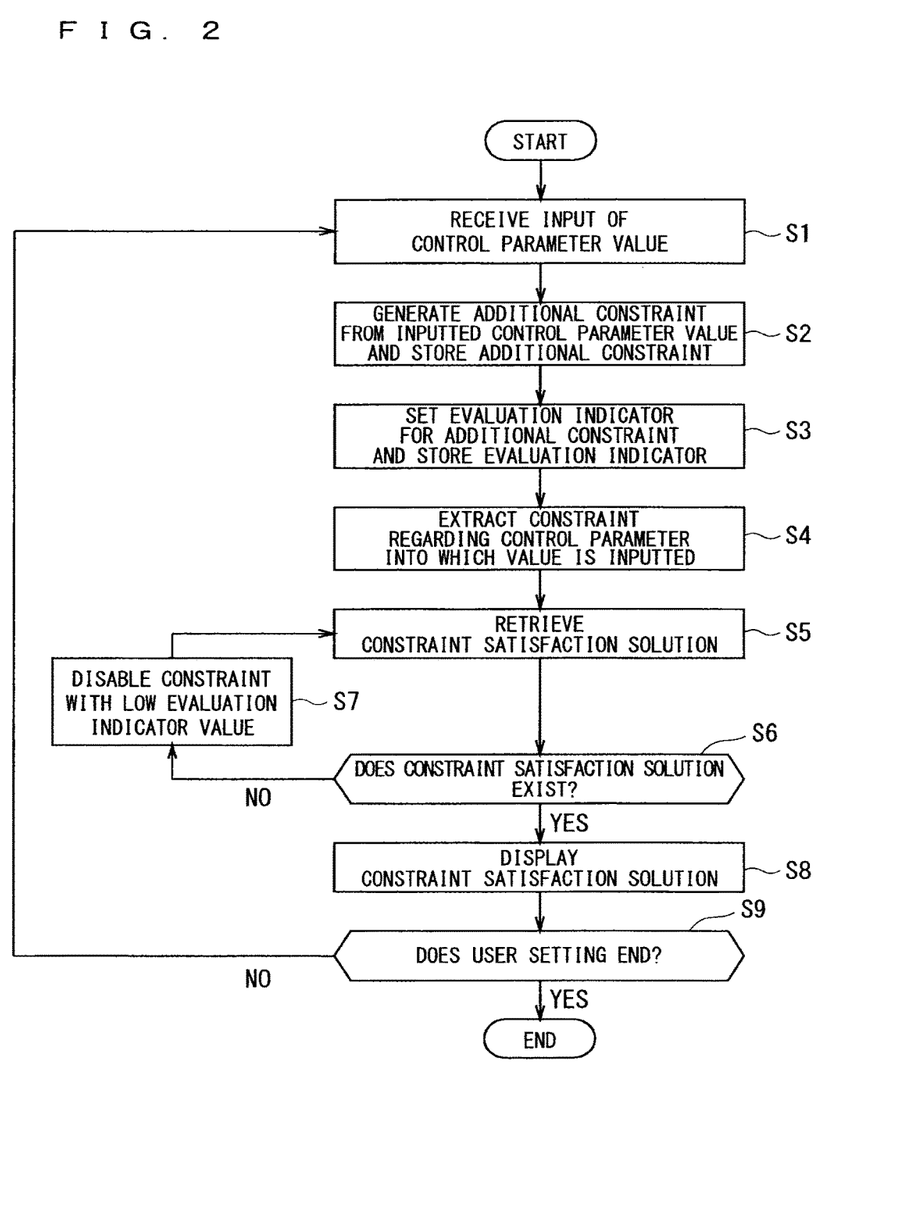
FIG. 2 is a flow chart illustrating operation of the parameter setting device according to the first embodiment.

FIG. 2 is a diagram illustrating a flow chart that illustrates operation of the parameter setting device 1 according to the present embodiment. The following describes the operation of the parameter setting device 1 with reference to this flow chart and examples illustrated in FIG. 3 to FIG. 8.

Figure 3:
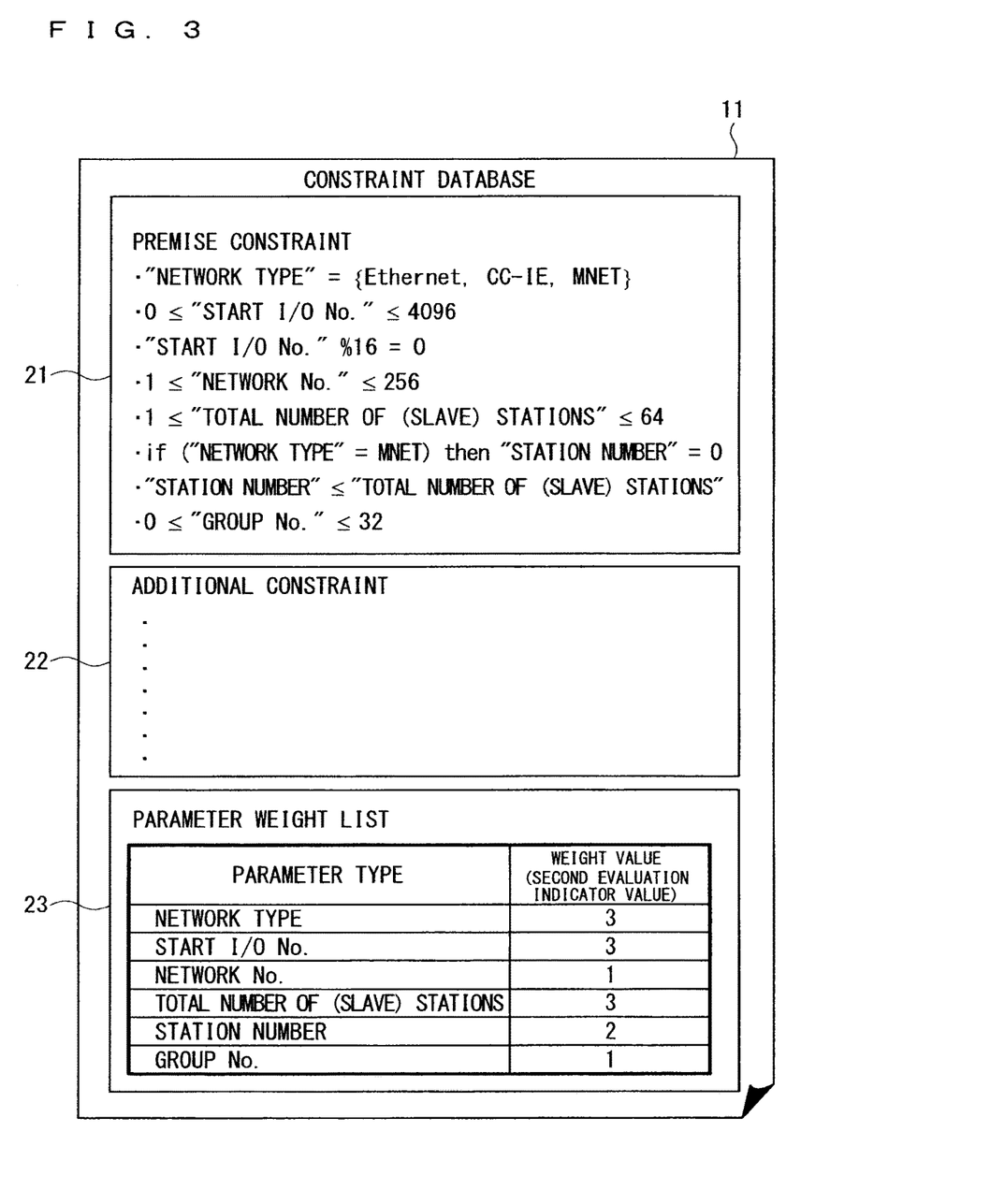
FIG. 3 is a diagram illustrating a constraint and parameter weight list stored in a constraint database according to the first embodiment.

Herein, FIG. 3 illustrates constraints stored in the constraint database 11 in an initial state before the parameter setting device 1 operates. As illustrated in this FIG. 3, the premise constraint 21 described in the premise constraint file 11*a* is stored in the constraint database 11 in the initial state. In contrast, the additional constraint 22 is not stored in the constraint database 11 in the initial state, and is generated by the constraint generator 13 in a course of the operation illustrated in the above-described flow chart.

In addition, in a parameter weight list 23, to each control parameter, weight (that is, the above-described second evaluation indicator) according to a property including at least one of importance degree of operation of the FA control apparatus defined by the control parameter, and a frequency degree of use and frequency degree of input of the control parameter is defined. That is, the weight is also stored (managed) in the constraint database 11. For example, in the example of the parameter weight list 23 illustrated in this FIG. 3, since a "network type" and a "total number of (slave) stations" have a strong degree of dependence on an environment in which the FA control apparatus is used and cannot be easily changed, the weight is heavily set (with a large value). In contrast, since "network No." and "group No." can be changed as long as consistency is maintained, the weight is lightly set (with a small value). Herein, the weight shall be settable by, for example, input from a user, etc.

Now, in step S1 illustrated in FIG. 2, the input unit 12 receives input of control parameter values from the user.

Figure 4:
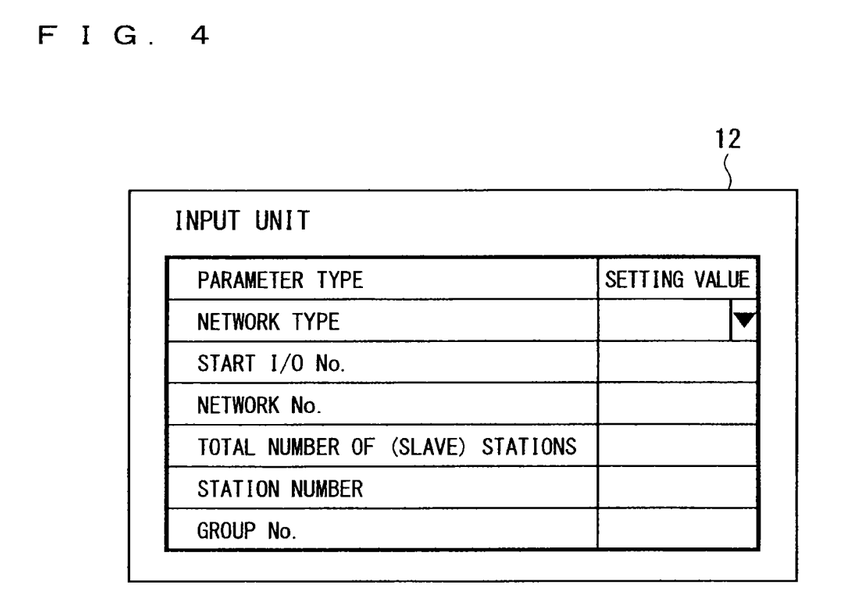
FIG. 4 is a diagram illustrating an example of control parameter values received by an input unit according to the first embodiment.
Figure 5:
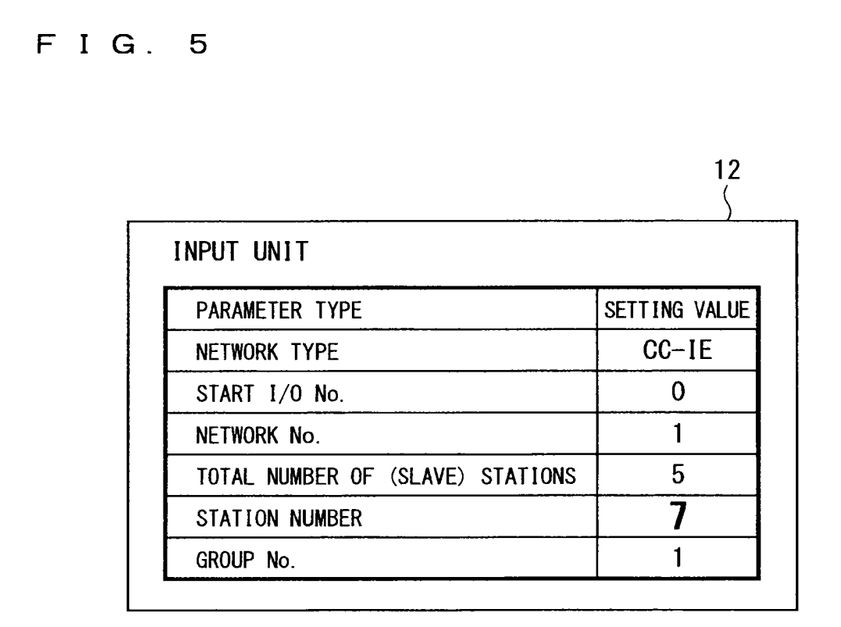
FIG. 5 is a diagram illustrating an example of the control parameter values received by the input unit according to the first embodiment.

FIG. 4 and FIG. 5 are diagrams each illustrating an example of the control parameter values received by the input unit 12. FIG. 4 illustrates a state before parameters for network setting of an FA controller are inputted, and FIG. 5 illustrates a state after the parameters for the network setting are inputted.

In the network setting of the FA controller, input (setting) is performed for parameter types of "network type", "start I/O No.", "network No.", "total number of (slave) stations", "station number", and "group No." Herein, in the "network type", as a network type used for communication of the FA control apparatus, one of Ethernet (registered trademark), CC-IE, and MNET can be specified from a pull-down button menu. In the "start I/O No.", a start of a region assigned for input/output of a communication unit is specified. In the "network No.", a number assigned for identifying one network from a plurality of networks is specified. In the "total number of (slave) stations", a number of FA control apparatuses connected to one network is specified. In the "station number", a number assigned for identifying the FA control apparatus is specified. In the "group No.", a number assigned for identifying the plurality of FA control apparatuses in one network is specified by a group.

Herein, it is assumed that steps S1 to S9 have already been repeated several times, and as illustrated in FIG. 5, that "CC-IE", "0", "1", "5", and "1" have already been inputted (already set) in "network type", "start I/O No.", "network No.", "total number of (slave) stations", and "group No.", respectively. Then, the following describes, in this state, a case where the input unit 12 receives input of "7" for "station number" as an example.

Returning to FIG. 2, in step S2, the constraint generator 13 generates the additional constraint 22 based on a value inputted in step S1 and a control parameter into which the value is inputted, and stores the additional constraint 22 in the constraint database 11.

Figure 6:
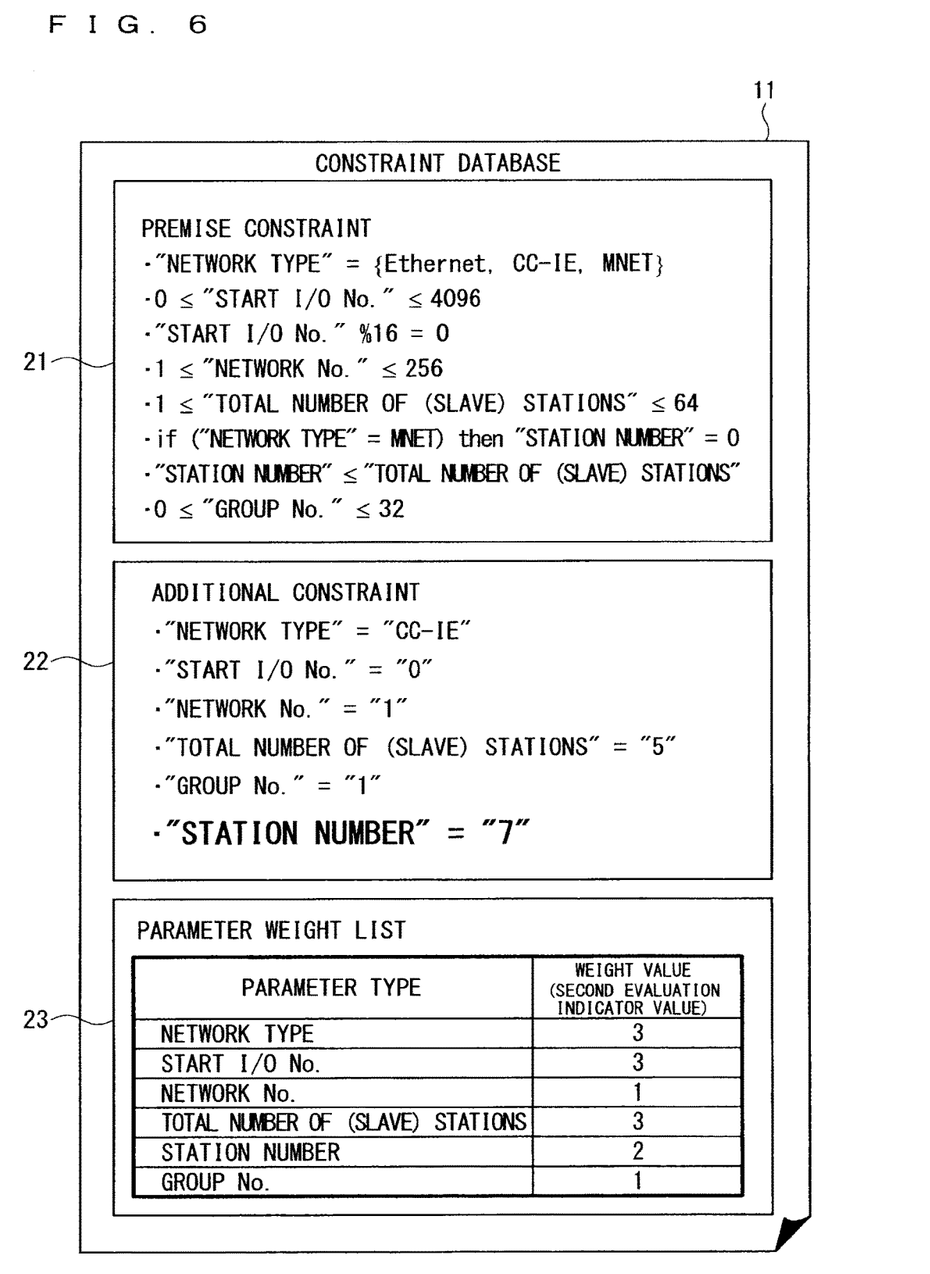
FIG. 6 is a diagram illustrating the constraint and parameter weight list stored in the constraint database according to the first embodiment.

FIG. 6 is a diagram illustrating an example of the constraint stored in the constraint database 11 after step S2. When "7" is inputted in "station number" in step S1, as illustrated in FIG. 6, the constraint generator 13 generates the additional constraint 22 of "station number"=7, and stores the additional constraint in the constraint database 11. Herein, in the example illustrated in FIG. 6, because steps S1 to S9 have already been repeated several times, additional constraints 22 other than the additional constraint 22 of "station number"=7 have been stored in the constraint database 11.

In this way, an additional constraint 22 will be stored in the constraint database 11 every time step S2 is performed. As a result, information regarding a constraint of a value that the control parameter can take on, and a constraint (premise constraint 21 and additional constraint 22) to be satisfied in a relationship between control parameters is stored in the constraint database 11.

Returning to FIG. 2, in step S3, regarding the additional constraint 22 (herein, one control parameter) newly stored in the constraint database 11, the constraint evaluation indicator setting unit 14 determines the above-described first evaluation indicator by executing a program expressed by the following equation (1).

[Equation 1]

$$G_n = \{p_n\} N = \text{Count}(G_n) f = \\ 1 do \left\{ f = \frac{f}{2} G'_n = \sum_c \text{Element}(G_n, c) G_n = G_n + G^*_n N = \\ N + f * \text{Count}(G^*_n) \right\} \text{while}(G^*_n \neq \{\}) V_{pn} = N \quad (1)$$

where $p_n$ is an nth-inputted control parameter, $G_n$, $G_n'$ are a set of control parameters, N, F are a numerical value, Count (X) is a function for determining a number of elements of a set X, c is a constraint, Element (X, c) is a function for determining a set of control parameters which are not elements of the set X included in constraint c when c includes control parameters which are elements of the set X, and $V_{pn}$ is a first evaluation indicator value for an additional constraint for $P_n$.

In this equation (1), first, an nth-inputted control parameter $p_n$ is given as an initial value of a set $G_n$, a number of elements of $G_n$ is given as an initial value of N, and 1 is given as an initial value of weight f. Subsequently, next operation is repeated one or more times.

<1> Weight f is multiplied by ½.

<2> For a constraint that has an element of the set $G_n$ as a control parameter among all constraints, a set of control parameters other than an element of the set $G_n$ included in the constraint is determined, and is defined as $G_n'$.

<3> $G_n'$ is added to the set $G_n$.

<4> What is made by multiplying a number of elements of $G_n'$ by weight f is added to N.

<5> When $G_n'$ is not an empty set, the operation returns to <1>.

$V_{pn}$ (=N) obtained by executing the program expressed by the above equation (1) is used as a value of the first evaluation indicator of the additional constraint 22.

Herein, the first evaluation indicator, which reflects a sum of Element ($G_n$, c) relating to all constraints c, becomes a larger value as a number of other control parameters affected by the control parameter that is an object for evaluation increases. In addition, the first evaluation indicator, which reflects N=N+f*Count ($G_n'$), becomes a larger value as a restrictive relationship is closer between the control parameter that is an object for evaluation and other control parameters affected by the change thereof.

Herein, when the program expressed by the equation (1) is executed to the additional constraint 22 of "station number"=7 newly stored in the constraint database 11, the first evaluation indicator of "2" is set to the additional constraint 22.

Figure 7:
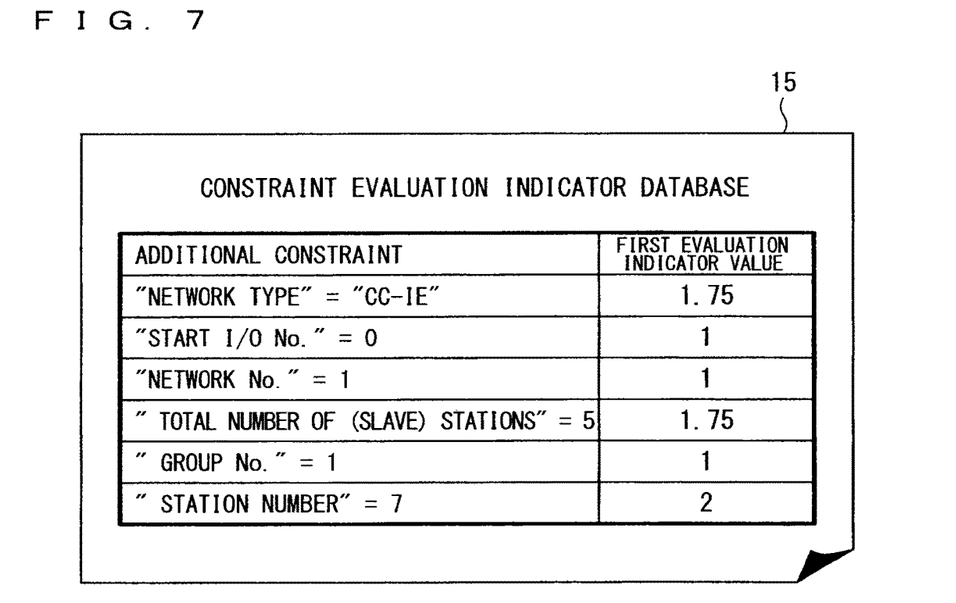
FIG. 7 is a diagram illustrating a first evaluation indicator stored in a constraint evaluation indicator database according to the first embodiment.

In step S3, the constraint evaluation indicator setting unit 14 stores the additional constraint 22 to which the first evaluation indicator is set in the constraint evaluation indicator database 15. FIG. 7 is a diagram illustrating the first evaluation indicator that is determined by the constraint evaluation indicator setting unit 14 based on the premise constraint 21 and additional constraint 22 illustrated in FIG. 6, the first evaluation indicator being stored in the constraint evaluation indicator database 15. As illustrated in FIG. 7, the additional constraint 22 of "station number"=7 and the first evaluation indicator of "2" that is set to the additional constraint 22 are associated, and stored in the constraint evaluation indicator database 15.

In addition, in a same way as the first evaluation indicator, in step S3, the constraint evaluation indicator setting unit 14 determines the second evaluation indicator that indicates weight according to the property of the above-described control parameter by executing a program expressed by the following equation (2) to the additional constraint 22 newly stored in the constraint database 11.

[Equation 2]

$$V_{pn} = W_{pn} \qquad (2)$$

where
$p_n$ is an nth-inputted control parameter,
$V_{pn}$ is a second evaluation indicator value for an additional constraint for $P_n$, and
$W_{pn}$ is weight of $p_n$.

In this equation (2), weight $W_{pn}$ of an nth-inputted control parameter $p_n$ is the second evaluation indicator for the additional constraint 22 of the control parameter $p_n$. A value of the second evaluation indicator is larger as weight (herein, weight that is set in the parameter weight list 23) of the inputted control parameter is heavier.

As described above, the constraint evaluation indicator setting unit 14 determines the value of the second evaluation indicator for each of the constraints (additional constraints 22) associated with the value of the first evaluation indicator in the constraint evaluation indicator database 15. Then, the constraint evaluation indicator setting unit 14 determines a value of the third evaluation indicator by multiplying the value of the first evaluation indicator and the value of the second evaluation indicator for each of the constraints (additional constraints 22), associates the determined value of the third evaluation indicator with the additional constraint 22, and stores the value of the third evaluation indicator in the constraint evaluation indicator database 15.

Figure 8:
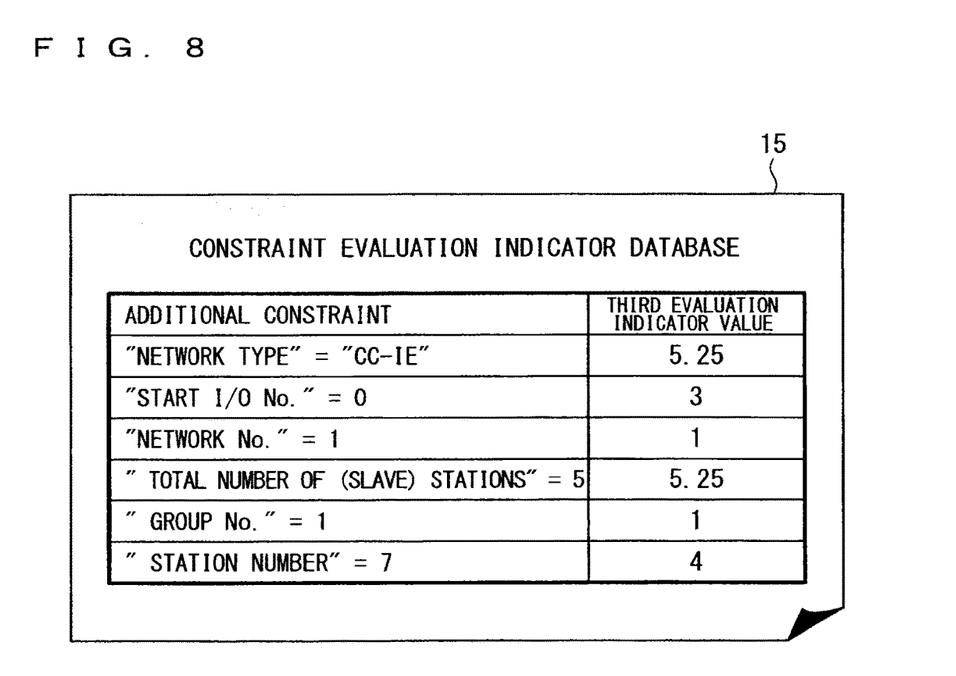
FIG. 8 is a diagram illustrating a third evaluation indicator stored in the constraint evaluation indicator database according to the first embodiment.

FIG. 8 is a diagram illustrating the third evaluation indicator value obtained by multiplying the first evaluation indicator value illustrated in FIG. 7 by the second evaluation indicator value that is set as the parameter weight list 23 illustrated in FIG. 6. In the example illustrated in FIG. 8, the third evaluation indicator value of "4" is determined by multiplying the first evaluation indicator value of "2" associated with the additional constraint 22 of "station number"=7 by the second evaluation indicator value of "2" associated with the "station number" in the parameter weight list 23. Then, the determined third evaluation indicator value of "4" is associated with the additional constraint 22 of "station number"=7, and stored in the constraint evaluation indicator database 15.

Returning to FIG. 2, in step S4, the constraint satisfaction solution retrieve unit 16 obtains the plurality of premise constraints 21 and additional constraints 22 from the constraint database 11 regarding the control parameter into which the value is inputted in step S1. Then, in step S5, the constraint satisfaction solution retrieve unit 16 retrieves a combination (constraint satisfaction solution) of control parameter values that satisfies the plurality of premise constraints 21 and additional constraints 22.

In step S6, the parameter setting device 1 determines whether a combination of control parameter values that satisfies the plurality of premise constraints 21 and additional constraints 22 has been retrieved or not. When the parameter setting device 1 determines that the combination of control parameter values has not been retrieved, the operation goes to step S7, and when the parameter setting device 1 determines that the combination of control parameter values has been retrieved, the operation goes to step S8.

In the above-described example, since input is performed into the control parameter of "station number" in step S1, the constraint satisfaction solution retrieve unit 16 extracts, from the constraint database 11 illustrated in FIG. 6, constraints of "station number"≤"total number of (slave) stations", 1≤"total number of (slave) stations"≤64, if ("network type"=MNET) then "station number"=0, "total number of (slave) stations"=5, and "station number"=7. The constraint satisfaction solution retrieve unit 16 retrieves a combination of control parameter values that satisfies these constraints. However, in these constraints, the constraints of "station number"≤"total number of (slave) stations", "total number of (slave) stations"=5, and "station number"=7 cause inconsistency. Therefore, in this example, it will be determined that a combination of parameter values that satisfies the constraints does not exist, and the operation goes to step S7.

In step S7, the constraint relaxing unit 18 disables one additional constraint 22 whose the third evaluation indicator is lowest among the inconsistency-causing constraints (premise constraints 21 and additional constraints 22), and relaxes the constraints as a whole. Subsequently, returning to step S5, the constraint satisfaction solution retrieve unit 16 retrieves a combination of control parameter values that satisfies the plurality of relaxed premise constraints 21 and additional constraints 22. Processing of the above-described steps S5, S6, and S7 is repeated until the combination of the control parameter values that satisfies the plurality of premise constraints 21 and additional constraints 22 is found.

In the above-described example, among the inconsistency-causing additional constraint 22 of "total number of (slave) stations"=5 and "station number"=7, since the value of the third evaluation indicator for the additional constraint 22 of "station number"=7 is lower as illustrated in FIG. 8, in step S7, the constraint relaxing unit 18 disables the additional constraint 22 of "station number"=7. Then, returning to step S5, the constraint satisfaction solution retrieve unit 16 retrieves (obtains) a combination (for example, "total number of (slave) stations"=5, "station number"=4) of control parameter values that satisfies constraints of "station number"≤"total number of (slave) stations", 1≤"total number of (slave) stations"≤64, if ("network type"=MNET) then "station number"=0, and "total number of (slave) stations"=5.

In step S8, the display 17 displays the combination (constraint satisfaction solution) of control parameter values retrieved in step S5. In step S9, the parameter setting device 1 determines whether closing of settings of control parameters is received from the user. When it is determined that closing is not received, the operation returns to step S1, and when it is determined that closing is received, a sequence of operations illustrated in FIG. 2 ends.

The above-described parameter setting device 1 according to the present embodiment, when a combination of control parameter values that satisfies constraints does not exist, relaxes the constraints in accordance with the third evaluation indicator obtained by combining the first evaluation indicator indicating a level of influence on other control parameters, and the second evaluation indicator indicating weight according to the property of the control parameter. That is, in a case where a constraint is not satisfied when a control parameter value is inputted, the constraint is relaxed so that setting of the value of a control parameter with big influence on other control parameters, a control parameter whose value is usually not changed, or an important control parameter whose value should not be changed, is not changed as much as possible, thereby allowing automatic determination of an appropriate combination of control parameter values.

In addition, the parameter setting device 1 according to the present embodiment displays the above-described appropriate combination of control parameters. Therefore, a user with little use experience can know at what value a control parameter should be set.

<Second Embodiment>

A constraint relaxing unit 18 according to a second embodiment of the present invention uses a fourth evaluation indicator to be described below instead of the above-described second evaluation indicator, and uses a fifth evaluation indicator obtained by combining the fourth evaluation indicator and the above-described first evaluation indicator instead of the above-described third evaluation indicator. Herein, in a parameter setting device 1 according to the present embodiment, components identical or similar to components described in the first embodiment are provided with identical symbols, and description will focus on a point different from the first embodiment.

Figure 9:
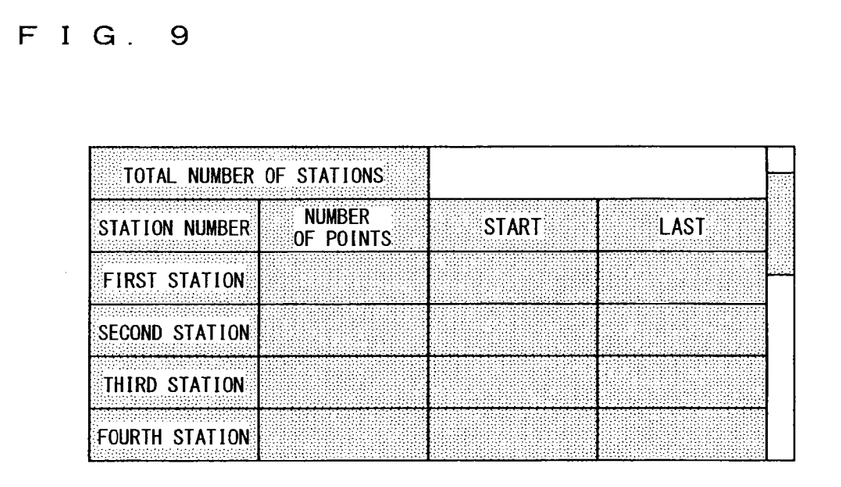
FIG. 9 is a diagram illustrating an example of the control parameter values received by the input unit according to a second embodiment.
Figure 10:
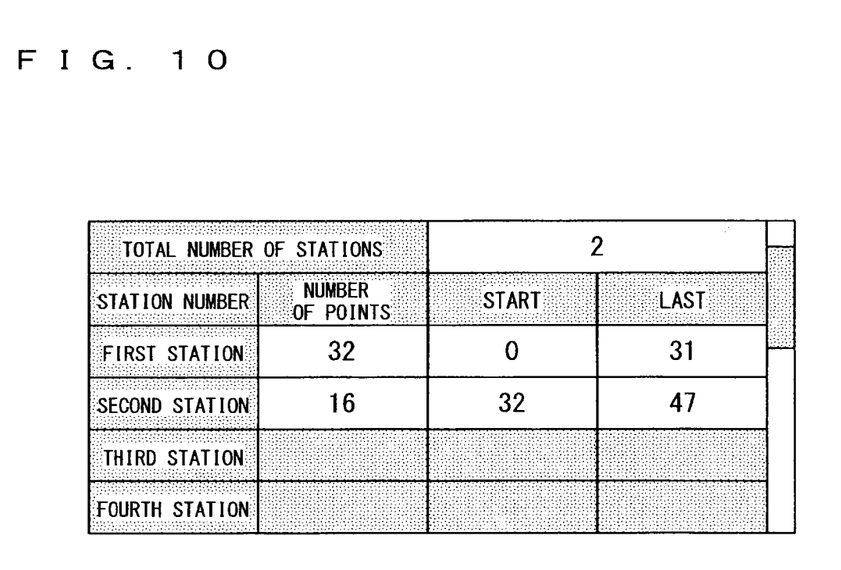
FIG. 10 is a diagram illustrating an example of the control parameter values received by the input unit according to the second embodiment.

The following describes a parameter for assignment of a memory range in an FA controller illustrated in FIG. 9 and FIG. 10 as an example. Herein, FIG. 9 illustrates a state before the parameter for memory assignment is inputted, and FIG. 10 illustrates a state after the parameter for memory assignment is inputted.

In memory assignment of the FA controller, 16 bits are defined as one point of a device unit. A number of points for assigning available memory for each unit, a start position thereof, and a last position thereof (a position separated by the number of points relative to the start position) are specified. At this time, each unit must be set so as not to use an identical memory area.

Figure 11:
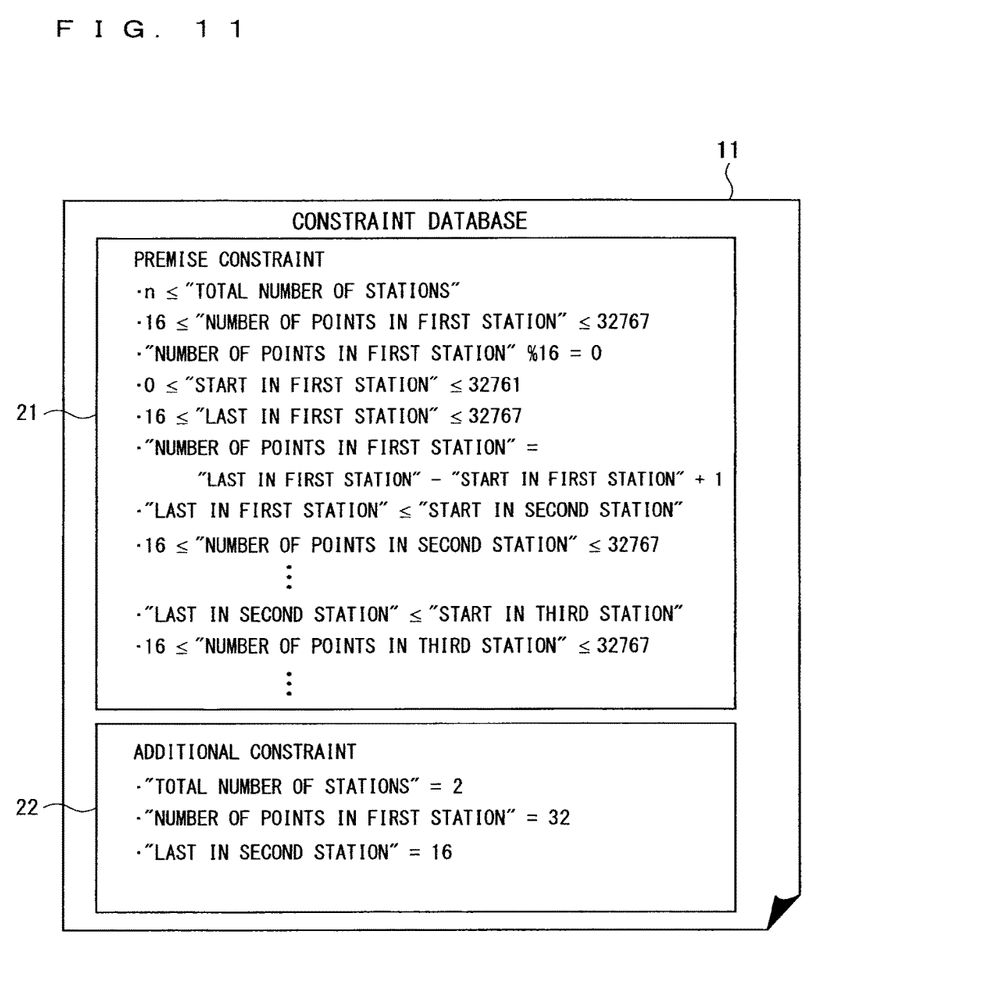
FIG. 11 is a diagram illustrating the constraint stored in the constraint database according to the second embodiment.

In an example illustrated in FIG. 11, such constraints are stored in a constraint database 11 as premise constraints 21. Then, additional constraints 22 are generated by a user performing, setting of "2" to the "total number of stations", setting of "32" to the "number of points" of a first station, and settings of "16" to the "last" of a second station, in this order, and the additional constraints 22 are stored in the constraint database 11.

In this case, when steps S1 to S9 are repeated several times, control Parameter is automatically complemented. An example of a result of the complement is illustrated in FIG. 10. In the example, "2" is inputted (set) to the "total number of stations", "32", "0", and "31" are inputted (set) to the "number of points", "start", and "last" of the first station, respectively, and "16", "32", and "47" are inputted (set) to the "number of points", "start", and "last" of the second station, respectively.

Herein, description will be given of a case where an input unit 12 receives input of "16" to the "last" of the second station as an example, after setting of "2" to the "total number of stations" and setting of "32" to the "number of points" of the first station are performed in this order by the user. Herein, since operation of the parameter setting device 1 according to the present embodiment differs from operation (FIG. 2) of the first embodiment only in step S3, the following will describe only operation of step S3.

A constraint evaluation indicator setting unit 14 according to the present embodiment sets the fourth evaluation indicator instead of the second evaluation indicator. The fourth evaluation indicator decreases in order in which the additional constraints 22 are generated by executing a program expressed by the following equation (3) to each of the plurality of additional constraints 22 in step S3.

[Equation 3]

$$V_{p1}=n$$
$$\text{for } (i=1;\ i<n;\ i=i+1)$$
$$\{$$
$$\quad V_{p(i+1)}=V_{pi}-1$$
$$\}$$
(3)

where
$p_n$ is an nth-inputted control parameter, and
$V_{pn}$ is a fourth evaluation indicator value for an additional constraint for $P_n$.

In this equation (3), first, a value of the fourth evaluation indicator of the additional constraint 22 generated based on a first-inputted control parameter value is set to n. Then, the value of the fourth evaluation indicator decreases one by one, like (n−1), (n−2), . . . in order in which the control parameter values are inputted, that is, in order in which the additional constraints 22 are generated. Finally, the value of the fourth evaluation indicator of the additional constraint 22 generated based on the nth-inputted control parameter value is set to 1. Herein, in the above-described example, input of "16" to the "last" of the second station is performed, after setting of "2" to the "total number of stations" and setting of "32" to the "number of points" of the first station are performed in this order by the user. Thus, the fourth evaluation indicator values of the additional constraints 22 of the "total number of stations"=2, "number of points in the first station"=32, and "last in the second station"=16 are "3", "2", and "1", respectively.

As described above, the constraint evaluation indicator setting unit 14 determines the value of the fourth evaluation indicator for each of the constraints (additional constraints 22) associated with the values of the first evaluation indicator in the constraint evaluation indicator database 15. Then, the constraint evaluation indicator setting unit 14 determines a value of the fifth evaluation indicator by multiplying the value of the first evaluation indicator and the value of the fourth evaluation indicator for each of the constraints (additional constraints 22). The constraint evaluation indicator setting unit 14 associates the determined values of the fifth evaluation indicator with the additional constraints 22, and stores the values of the fifth evaluation indicator in the constraint evaluation indicator database 15.

Figure 12:
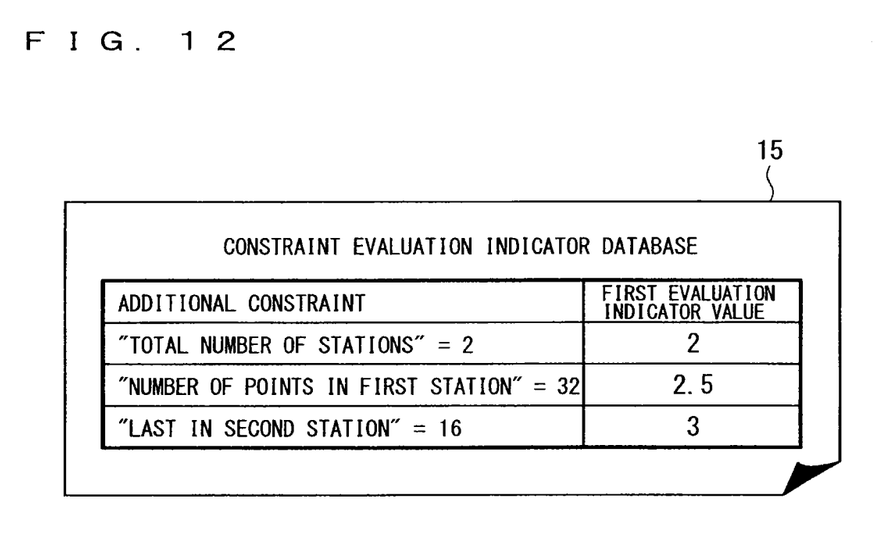
FIG. 12 is a diagram illustrating the first evaluation indicator stored in the constraint evaluation indicator database according to the second embodiment.
Figure 13:
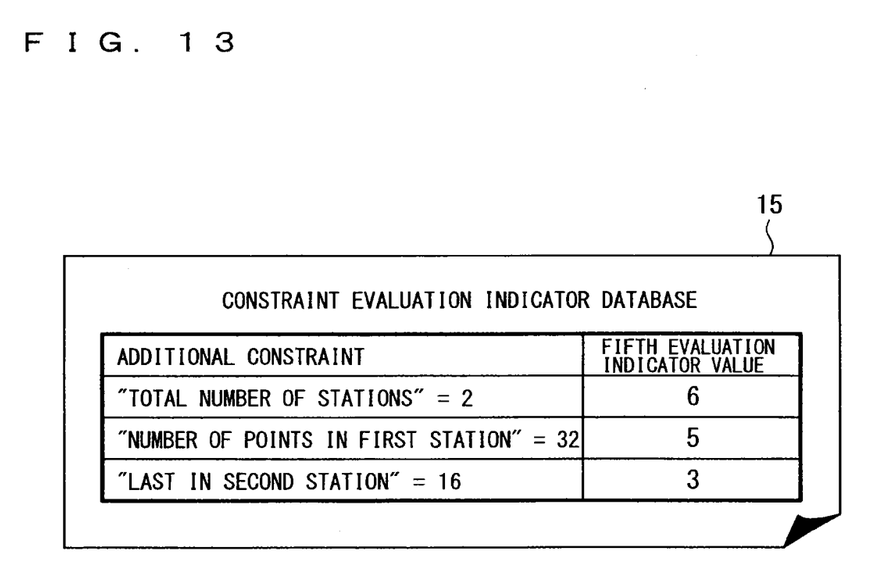
FIG. 13 is a diagram illustrating a fifth evaluation indicator stored in the constraint evaluation indicator database according to the second embodiment.

FIG. 12 is a diagram illustrating the first evaluation indicator that is determined by the constraint evaluation indicator setting unit 14 based on the premise constraints 21 and the additional constraints 22 illustrated in FIG. 11, and are stored in the constraint evaluation indicator database 15. FIG. 13 is a diagram illustrating the fifth evaluation indicator that is determined by the constraint evaluation indicator setting unit 14 for each of the constraints (additional constraints 22) associated with the value of the first evaluation indicator, and is stored in the constraint evaluation indicator database 15. In the example illustrated in FIG. 13, for example, the fifth evaluation indicator of "5" is determined by multiplying the first evaluation indicator of "2.5" associated with the additional constraint 22 of the "number of points in the first station"=32 by the fourth evaluation indicator of "2" associated with the additional constraint 22. Then, the determined fifth evaluation indicator of "5" is associated with the additional constraint 22 of the "number of points in the first station"=32, and is stored in the constraint evaluation indicator database 15.

Hereinafter, operation similar to operation of the first embodiment is performed. A brief description is that, on an assumption that a control parameter value that satisfies the plurality of premise constraints 21 and additional constraints 22 does not exist, in step S7, the constraint relaxing unit 18 disables one additional constraint 22 ("last in the second station"=16) whose the fifth evaluation indicator is lowest among the inconsistency-causing constraints (premise constraint 21 and additional constraint 22). As a result, as illustrated in FIG. 10, setting of the "last" of the second station has been changed from "16" to "47".

The parameter setting device 1 according to the present embodiment uses the above-described fourth evaluation indicator instead of the second evaluation indicator, and uses the fifth evaluation indicator obtained by combining the fourth evaluation indicator and the above-described first evaluation indicator instead of the above-described third evaluation indicator. Therefore, when a combination of control parameter values that satisfies a constraint does not exist, the constraint is relaxed in accordance with the fifth evaluation indicator obtained by combining the first evaluation indicator indicating a level of influence on other control parameters, and the fourth evaluation indicator decreasing in order of generation of the additional constraints 22. That is, in a case where a constraint is not satisfied when a control parameter value is inputted, the constraint is relaxed so that setting of the value of a control parameter with big influence on other control parameters, or a control parameter used from the past, is not changed as much as possible, thereby allowing automatic determination of an appropriate combination of control parameter values.

<Third Embodiment>

A constraint relaxing unit 18 according to a third embodiment of the present invention uses a sixth evaluation indicator that reflects at least one of the above-described third evaluation indicator and the fifth evaluation indicator. Herein, in a parameter setting device 1 according to the present embodiment, components identical or similar to components described in the first embodiment are provided with identical symbols, and description will focus on a point different from the first embodiment.

Figure 14:
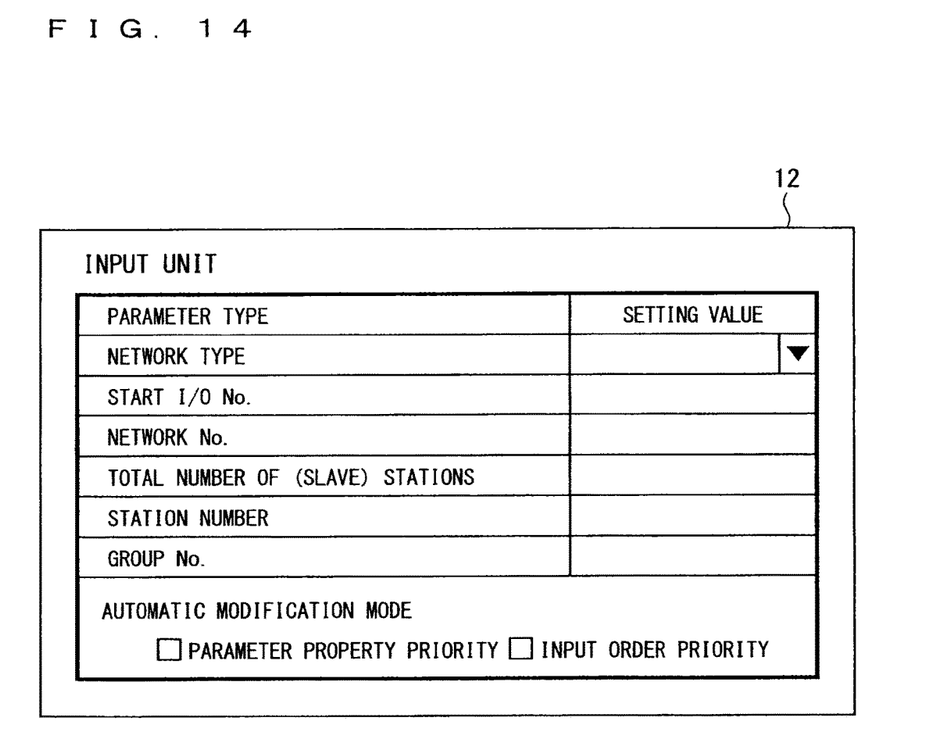
FIG. 14 is a diagram illustrating an example of the control parameter values received by the input unit according to a third embodiment.

FIG. 14 is a diagram illustrating an example of control parameter values received by an input unit 12 according to the present embodiment. In the present embodiment, the input unit 12 receives a check mark for selecting at least one of the above-described third evaluation indicator and the fifth evaluation indicator. Then, for example, when a check mark is inputted into a check box of parameter property priority illustrated in FIG. 14, the constraint relaxing unit 18 relaxes a constraint by using the sixth evaluation indicator that reflects the third evaluation indicator. In addition, for example, when a check mark is inputted into a check box of input order priority, the constraint relaxing unit 18 relaxes a constraint by using the sixth evaluation indicator that reflects the fifth evaluation indicator.

In the present embodiment, a constraint evaluation indicator setting unit 14 obtains the third evaluation indicator and fifth evaluation indicator described in the first and second embodiments for each of a plurality of additional constraints 22. Then, by executing a program expressed by the following equation (4) to each of the plurality of additional constraints 22, the constraint evaluation indicator setting unit 14 sets the sixth evaluation indicator obtained by calculating at least one product (at least one into which a check mark is inputted) selected by a user from among the third evaluation indicator and the fifth evaluation indicator.

[Equation 4]

$$V_{pn} = F_1' * F_2'$$

$$F_1' = \max(a_1 * F_1, 1)$$

$$F_2' = \max(b_2 * F_2, 1) \quad (4)$$

where $V_{pn}$ is a sixth evaluation indicator value for an additional constraint for $P_n$, $F_1$ is a third evaluation indicator value, $a_1$ is 1 when priority is given to control parameter property, and is 0 when priority is not given, $F_2$ is a fifth evaluation indicator value, $b_2$ is 1 when priority is given to input order, and is 0 when priority is not given, and max(x, y) is a function for selecting one with a larger value from among x and y.

However, herein, values of $F_1$ and $F_2$ are larger than 1.

The parameter setting device 1 according to the present embodiment uses the above-described sixth evaluation indicator instead of the third evaluation indicator or the fifth evaluation indicator, the sixth evaluation indicator reflecting at least one desired by the user from among the third evaluation indicator and the fifth evaluation indicator. Therefore, the user can relax a constraint in accordance with his or her own desire.

Herein, arbitrary combination of each embodiment, and variation and omission of each embodiment of the present invention can be appropriately made within the scope of the invention.

REFERENCE SIGN LIST

1 parameter setting device, 11 constraint database, 13 constraint generator, 14 constraint evaluation indicator setting unit, 16 constraint satisfaction solution retrieve unit, 17 display, 18 constraint relaxing unit, 21 premise constraint, and 22 additional constraint.

The invention claimed is:

1. A parameter setting device for setting a plurality of control parameters for a control apparatus that controls a predetermined device, the parameter setting device comprising:
a constraint database configured to store a plurality of existing constraints to be satisfied by said plurality of control parameters;
an input unit that receives input of an inputted control parameter value for a control parameter from a user who uses the predetermined device;
a constraint generator configured, based on the inputted control parameter value, to generate a plurality of new constraints to be satisfied by the inputted control parameter value;
a processor programmed to perform as a constraint evaluation indicator setting unit configured to set a third evaluation indicator obtained by combining a first evaluation indicator and a second evaluation indicator to each of said plurality of new constraints, the first evaluation indicator indicating a level of influence on other control parameters when said control parameter related to said new constraint is changed, the second evaluation indicator indicating weight according to a property including at least one of importance degree of operation of said control apparatus defined by said control parameter related to said new constraint, and a frequency degree of use and frequency degree of input of said control parameter;
a constraint satisfaction solution retrieve unit configured to retrieve a combination of said control parameter values that satisfies said plurality of new and existing constraints; and
a constraint relaxing unit configured to relax said plurality of new constraints in accordance with said third evaluation indicator when said constraint satisfaction solution retrieve unit fails to retrieve the combination of said control parameter values that satisfies said plurality of new and existing constraints,
wherein, when said constraint relaxing unit relaxes said plurality of new constraints to produce relaxed constraints, said constraint satisfaction solution retrieve unit retrieves the combination of said control parameter values that satisfies the relaxed constraints and said plurality of existing constraints, and the control apparatus controls the predetermined device according to the combination of said control parameter values that satisfies the relaxed constraints and said plurality of existing constraints.

2. The parameter setting device according to claim 1, wherein said constraint relaxing unit relaxes said plurality of new constraints by disabling one of said new constraints whose said third evaluation indicator is lowest.

3. The parameter setting device according to claim 1, wherein
said constraint evaluation indicator setting unit obtains a fifth evaluation indicator obtained by combining said first evaluation indicator and a fourth evaluation indicator decreasing in order in which said new constraints are generated, for each of said plurality of new constraints and sets a sixth evaluation indicator that reflects at least one selected by a user from among said third evaluation indicator and fifth evaluation indicator in addition to setting of said third evaluation indicator, and
said constraint relaxing unit uses said sixth evaluation indicator instead of said third evaluation indicator.

4. A parameter setting device for setting a plurality of control parameters for a control apparatus that controls a predetermined device, the parameter setting device comprising:
a constraint database configured to store a plurality of existing constraints to be satisfied by said plurality of control parameters;
an input unit that receives input of an inputted control parameter value for a control parameter from a user who uses the predetermined device;
a constraint generator configured, based on the inputted control parameter value, to generate a plurality of new constraints to be satisfied by the inputted control parameter value;
a processor programmed to perform as a constraint evaluation indicator setting unit configured to set a fifth evaluation indicator obtained by combining a first evaluation indicator and a fourth evaluation indicator to each of said plurality of new constraints, the first evaluation indicator indicating a level of influence on other control parameters when said control parameter related to said new constraint is changed, the fourth evaluation indicator decreasing in order in which said new constraints are generated;
a constraint satisfaction solution retrieve unit configured to retrieve a combination of said control parameter values that satisfies said plurality of new and existing constraints; and
a constraint relaxing unit configured to relax said plurality of new constraints in accordance with said fifth evaluation indicator when said constraint satisfaction solution retrieve unit fails to retrieve the combination of said control parameter values that satisfies said plurality of new and existing constraints,
wherein, when said constraint relaxing unit relaxes said plurality of new constraints to produce relaxed constraints, said constraint satisfaction solution retrieve unit retrieves the combination of said control parameter values that satisfies the relaxed constraints and said plurality of existing constraints, and the control apparatus controls the predetermined device according to the combination of said control parameter values that satisfies the relaxed constraints and said plurality of existing constraints.

5. The parameter setting device according to claim 4, wherein said constraint relaxing unit relaxes said plurality of new constraints by disabling one of said new constraints whose said fifth evaluation indicator is lowest.

6. The parameter setting device according to claim 1, further comprising a display configured to display the combination of said control parameter values retrieved by said constraint satisfaction solution retrieve unit.

* * * * *